(12) United States Patent
Ye et al.

(10) Patent No.: US 8,271,874 B2
(45) Date of Patent: Sep. 18, 2012

(54) METHOD AND APPARATUS FOR LOCATING AND TRANSFORMING DATA

(75) Inventors: Sheng Ye, Beijing (CN); Wei Sun, Beijing (CN); Zhong Tian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1707 days.

(21) Appl. No.: 10/689,186

(22) Filed: Oct. 20, 2003

(65) Prior Publication Data

US 2004/0083242 A1      Apr. 29, 2004

(30) Foreign Application Priority Data

Oct. 24, 2002   (CN) ................................. 02 1 47150

(51) Int. Cl.
*G06F 17/00*    (2006.01)
(52) U.S. Cl. ......... 715/272; 715/249; 715/256; 715/243
(58) Field of Classification Search .................. 715/539, 715/523, 531, 517
See application file for complete search history.

(56) References Cited

U.S. PATENT DOCUMENTS

| | | | |
|---|---|---|---|
| 4,965,763 A | 10/1990 | Zamora | 704/1 |
| 5,664,109 A | 9/1997 | Johnson et al. | 705/2 |
| 5,913,214 A | 6/1999 | Madnick et al. | 707/10 |
| 6,339,795 B1 | 1/2002 | Narurkar et al. | 709/246 |
| 6,732,331 B1 * | 5/2004 | Alexander | 715/513 |
| 6,963,878 B2 * | 11/2005 | Anson | 707/102 |
| 7,024,633 B1 * | 4/2006 | Mann et al. | 715/765 |
| 2002/0013790 A1 | 1/2002 | Vandersluis | |
| 2003/0055849 A1 * | 3/2003 | Thure et al. | 707/500 |

FOREIGN PATENT DOCUMENTS

EP            1016982        7/2000

OTHER PUBLICATIONS

Barr, Michael; Programming Embedded Systems in C and C++; Publisher: O'Reilly; Pub Date: Jan. 1999; pp. 1 and 2.*
"Overview of XML Convert and XFlat," Feb. 7, 2002, http://www.unidex.com/overview.htm, 7 pages.

* cited by examiner

*Primary Examiner* — Cesar Paula
*Assistant Examiner* — Nathan Hillery
(74) *Attorney, Agent, or Firm* — Ryan, Mason & Lewis, LLP

(57) ABSTRACT

The invention provides method and apparatus for locating data in a data file and for transforming the data. The method comprises the steps: determining the data unit to be located in the data file; determining a type for the data unit, the type including "Text", "SingleLine", "MultiLine", "Block" and "Iterator"; when the type of the data unit is not "Text", selecting a different data unit as the location reference for the data unit; generating the location description for the data unit, based on the type of the data unit and the position relationship between the data unit and the different data unit, the description including the type of the data unit, one or more location elements for locating the data unit and including "Top", "Bottom", "Left" and "Right", each of the location elements including a combination of attributes so as to determine the position of the location element. The invention may locate the data position by two dimensional area.

20 Claims, 7 Drawing Sheets

METHOD AND APPARATUS FOR LOCATING AND TRANSFORMING DATA

FIELD OF THE INVENTION

The present invention relates to computer data processing, and more particularly, method and apparatus for locating and transforming data in a data file.

BACKGROUND OF THE INVENTION

With the development of the Information Technology, more and more enterprises begin to use various applications to manage different data information, and then different kinds of data files are formed. Further, the communications between the enterprises are becoming closer and closer, such that the data exchange inside the enterprise and between the enterprises is becoming frequent. Then a problem is introduced that successfully exchanging data having different format is necessary for integrating different network application system.

In the prior art, the specialized data transformation tool is developed for a particular application system, in order to transform an original data into an objective data. However, in such a data transformation technology, the coding of the data transformation tool needs to be updated or debugged whenever the data format of the application system is changed. Such a data exchange technology wastes time and human resource and the efficiency of which is also low.

In order to exchange data, it is firstly needed to understand, analyze and process the original data having different formats. Most of the prior application systems utilize the method of generating and processing the data files having relatively fixed formats and structures. And it is therefore naturally developed the data transformation methods and the tools for locating, extracting and transforming the data in a data file. The data file named herein typically refers to the file encoded as printable characters, including the text formats understandable by machines such as the inquiry results list of a database, EDI messages, the recognized results by scanning imagines in a table process system, the general reports used for reading, transmitting or printing, which are generated by EPR or other application system.

The prior technologies for locating and transforming the data in a data file includes the XML Converter developed by the Unidex company. The XML Converter transforms the data in the data file having simple and delimitated format. For example, it requires the data file to be processed must consist of records, where each record is a sequence of fields. The records and the fields are delimitated by separators. The fields that are not delimited must have fixed length.

Additionally, U.S. Pat. No. 4,965,763 discloses a data transformation method to analyze data files by using the structural, syntactic and semantic knowledge about the data files. This patent is particularly appropriated to extract information from business correspondence documents.

U.S. Pat. No. 5,664,109 discloses a technology for locating and extracting data by key words.

The patent is used to automatically retrieve documents from a medical records repository.

European patent EP 1016982 discloses a method for extracting and outputting data from a database having better structure.

The above prior art, however, can only apply in specific application environments, and provide the key words matching or semantic analysis, and therefore adapt merely to process the text having simple format.

As a result, a generic data extracting and transforming method and tool for various data files is needed to simply and efficiently transform the data in the data files.

SUMMARY OF THE INVENTION

To solve the above problems in the prior art, an object of the invention is to provide a data locating apparatus and method based on text markup matching and two dimensional space position locating.

Another object of the invention is to provide a data transforming apparatus and method based on text markup matching and two dimensional space position locating.

The invention provides a method for locating data in a data file, comprising:
determining the data unit to be located in the data file;
determining a type for the data unit, the type including "Text", "SingleLine", "MultiLine", "Block" and "Iterator";
when the type of the data unit is not "Text",
selecting a different data unit as the location reference for the data unit;
generating the location description for the data unit, based on the type of the data unit and the position relationship between the data unit and the different data unit, the description including the type of the data unit, one or more location elements for locating the data unit and including "Top", "Bottom", "Left" and "Right",
each of the location elements including a combination of attributes so as to determine the position of the location element, the attributes including:
"Base", which is the different data unit;
"From", which is a position in the "Base" and used as the location referring position for the location element;
"Skip", which represents the offset of the location element from the "From".

According to the method for locating data in a data file of the invention, the "Base" is the data unit having the type of "Text" or any data unit the attributes of the location elements of which have been determined.

The invention provides an apparatus for locating data in a data file, comprising:
a data unit determination unit, a type determination unit, a location reference determination unit and a data unit location description generation unit,
the data unit determination unit determining the data unit to be located in the data file;
the type determination unit determining a type for the data unit, the type including "Text", "SingleLine", "MultiLine", "Block" and "Iterator";
when the type of the data unit is not "Text",
the location reference determination unit selecting a different data unit as the location reference for the data unit;
the data unit location description generation unit generating the location description for the data unit, based on the type of the data unit and the position relationship between the data unit and the different data unit, the description including the type of the data unit, one or more location elements for locating the data unit and including "Top", "Bottom", "Left" and "Right",
each of the location elements including a combination of attributes so as to determine the position of the location element, the attributes including:
"Base", which is the different data unit;
"From", which is a position in the "Base" and used as the location referring position for the location element;
"Skip", which represents the offset of the location element from the "From".

The invention provides a data transformation method, for transforming data in a first data file having a first format into data in a second data file having a second format, the data transformation method comprising:

data searching step, for searching the data in the first data file to determine the position of the data;

data extracting step, for extracting the data the position of which has been determined;

data transforming step, for transforming the extracted data into data in the second data file, characterized by:

generating the location description for one or more data units in the first data file to be located, and building up the correspondence between the data units and the second format of the second data file, before the data searching step, and for each of the data units, performing the steps:

determining a type for the data unit, the type including "Text", "SingleLine", "MultiLine", "Block" and "Iterator";

when the type of the data unit is not "Text", selecting a different data unit as the location reference for the data unit;

generating the location description for the data unit, based on the type of the data unit and the position relationship between the data unit and the different data unit, the description including the type of the data unit, one or more location elements for locating the data unit and including "Top", "Bottom", "Left" and "Right", each of the location elements including a combination of attributes so as to determine the position of the location element, the attributes including:

"Base", which is the different data unit;

"From", which is a position in the "Base" and used as the location referring position for the location element;

"Skip", which represents the offset of the location element from the "From", the data searching step locating the data units based on the location descriptions on the one or more data units;

the data extracting step extracting the one or more data units being located;

the data transformation step transforming the data units in the first data file extracted in the data extracting step into the data having the second format, based on the correspondence build between the one or more data units and the second format, so as to generate the data in one or more second data files.

The invention provides a data transformation apparatus, for transforming data in a first data file having a first format into data in a second data file having a second format, the data transformation apparatus comprising:

a data searching unit, for searching the data in the first data file to determine the position of the data;

a data extracting unit, for extracting the data the position of which has been determined;

a data transforming unit, for transforming the extracted data into data in the second data file, characterized in that the data transformation apparatus further comprises:

a data unit determination unit, a type determination unit, a location reference determination unit, a data unit location description generation unit and a format mapping unit, the data unit determination unit determining the data unit to be located in the data file;

for each of the data units, performing the steps:

the type determination determining a type for the data unit, the type including "Text", "SingleLine", "MultiLine", "Block" and "Iterator";

when the type of the data unit is not "Text", the location reference determination unit selecting a different data unit as the location reference for the data unit;

the data unit location description unit generating the location description for the data unit, based on the type of the data unit and the position relationship between the data unit and the different data unit, the description including the type of the data unit, one or more location elements for locating the data unit and including "Top", "Bottom", "Left" and "Right", each of the location elements including a combination of attributes so as to determine the position of the location element, the attributes including:

"Base", which is the different data unit;

"From", which is a position in the "Base" and used as the location referring position for the location element;

"Skip", which represents the offset of the location element from the "From", the format mapping unit building up the correspondence between the one or more data units and the second format of the second data file, the data searching unit searching the data units based on the location descriptions on the one or more data units and determining the positions thereof;

the data extracting unit extracting the one or more data units the positions of which have been determined;

the data transformation unit transforming the data units in the first data file extracted in the data extracting unit into the data having the second format, based on the correspondence build between the one or more data units and the second format, so as to generate the data in one or more second data files.

The invention has an advantage of being capable to transform data in the data files having various structures.

The invention has another advantage of enabling a user to flexibly set the extraction rule and output rule on the original data when necessary.

The invention has another advantage that the invention not only provides the method of locating the data position based on the start point and the stop point of data, but also the method of locating the data position based on two dimensional area, so that the flexibility of data locating is improved.

The invention has another advantage that the transformation rule may be flexibly and extensively changed, by separating the data locating from the data transforming.

The invention may be used to transform the data having specific format in batch mode.

The object and the advantage of the invention will be more apparent by reference to the preferred embodiments in accompanying with the drawings.

DETAILED DESCRIPTION OF THE INVENTION

Figure 1:
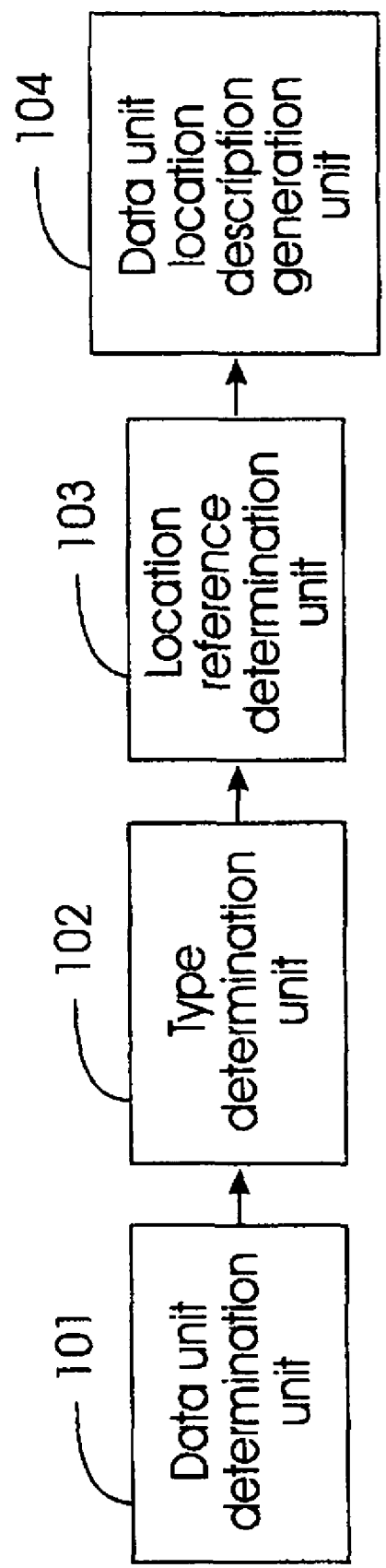
FIG. 1 is a block diagram of a data locating device of the invention.

The data locating device according to the invention will be described now. FIG. 1 is a block diagram of a data locating device of the invention.

The data locating device according to the invention comprises a data unit determination unit 101, a type determination unit 102, a location reference determination unit 103 and a data unit location description generation unit 104.

The data locating device according to the invention generates one or more data units location descriptions based on which the data in an original data file is located and extracted.

The data determination unit 101 determines one or more data units to be located in an original data file. The data unit called herein is a basic unit for data locating according to the invention. The determination of a data unit will be described in detail later. In addition, the data locating device is described herein by locating data in one original data file, for convenience. However, the data locating device according to the invention may adapt to locate data in a plurality of data files, which will be described in detail later.

For each of the data units:
the type determination unit 102 determines a type for the data unit;
the location reference determination unit 103 selects a different data unit as the location reference for the data unit;
the data unit location description generation unit 104 generates the location description for the data unit, based on the type of the data unit and the position relationship between the data unit and the different data unit.

Figure 2:
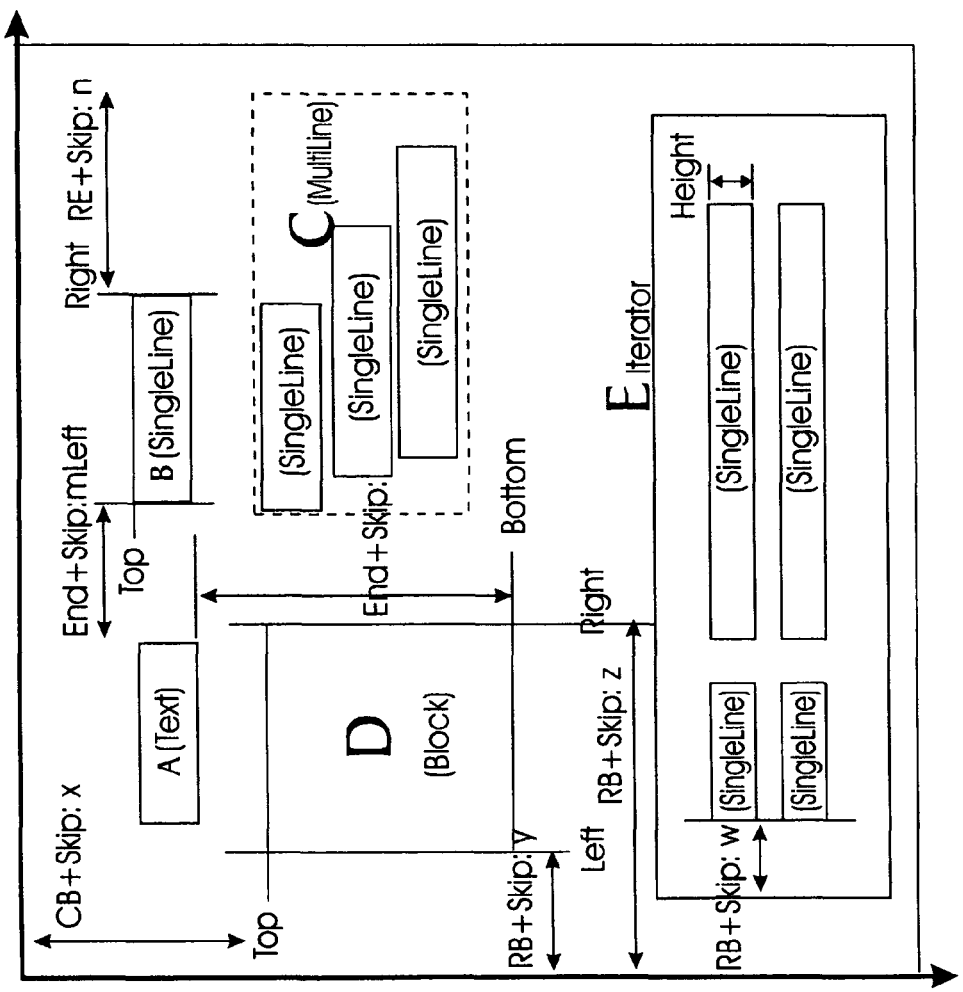
FIG. 2 is a diagram showing data locating according to a data locating method of the invention.
Figure 3:
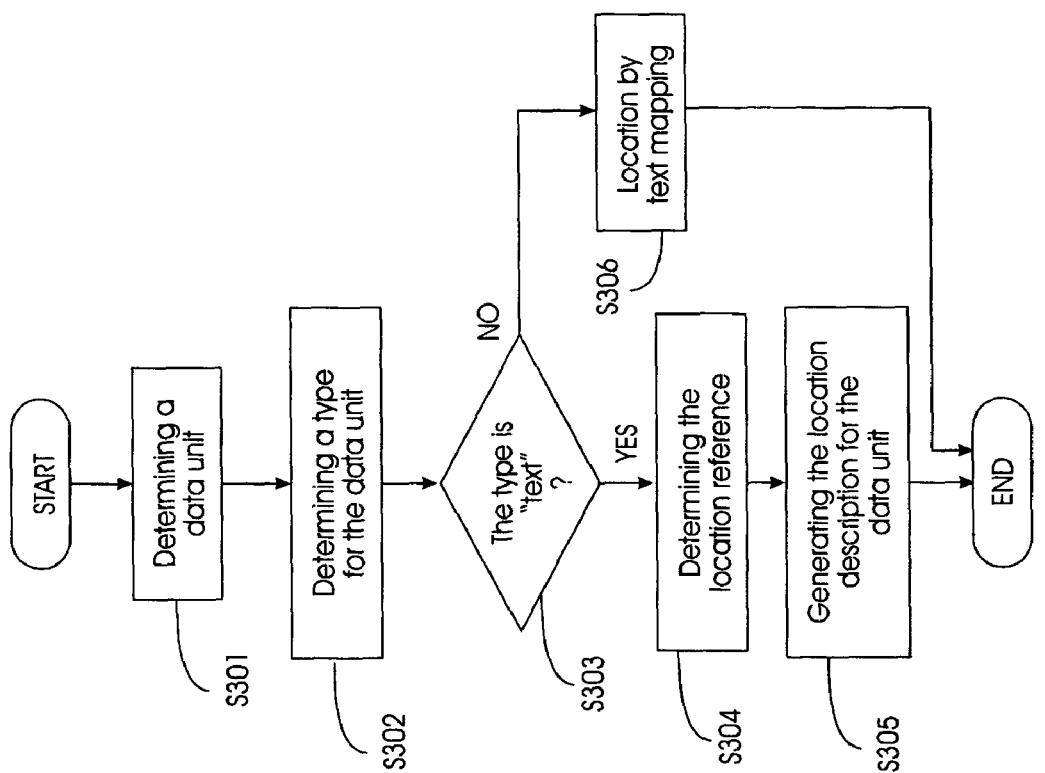
FIG. 3 is a flow chart of a data locating method of the invention.
Figure 4:
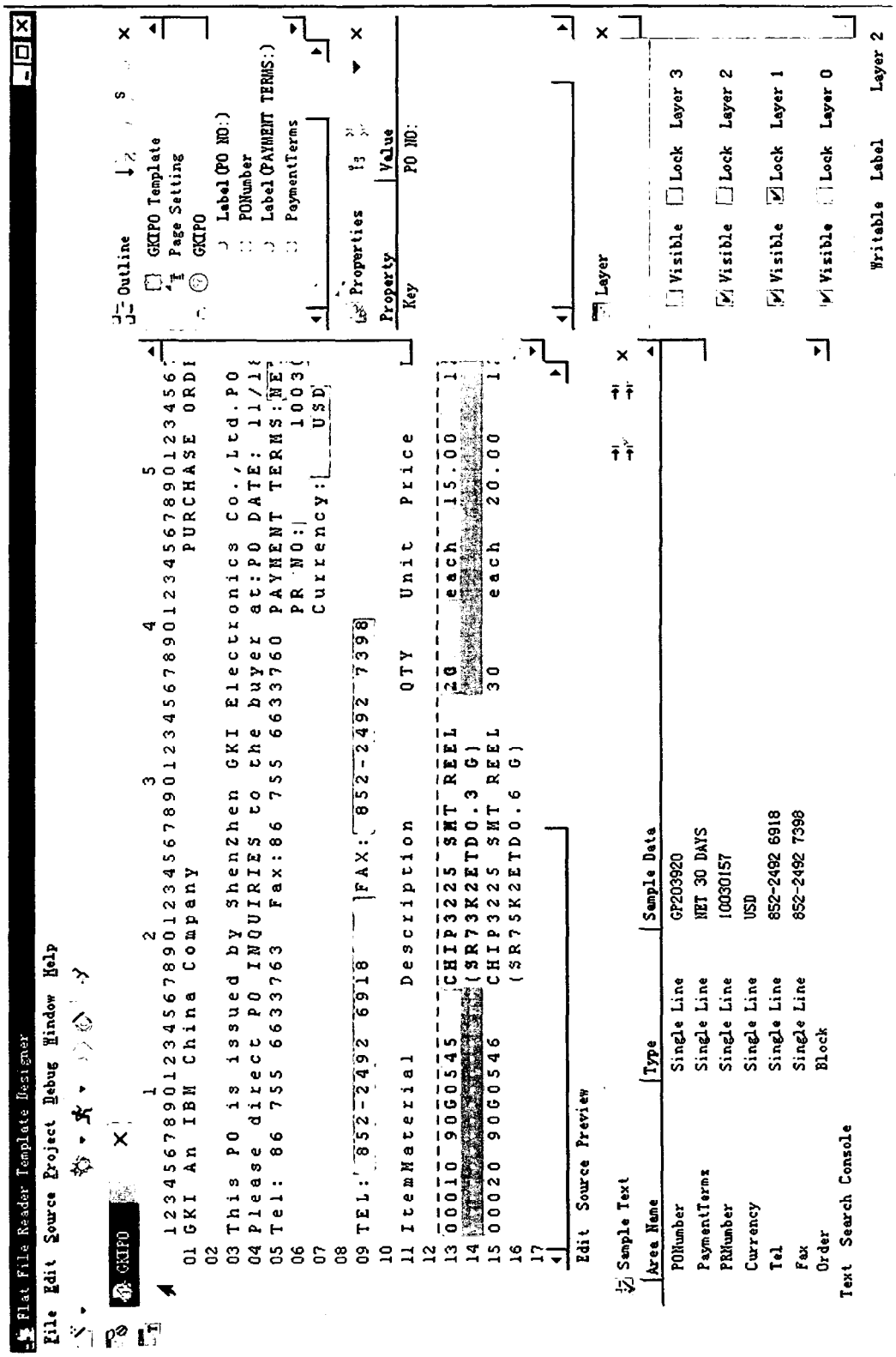
FIG. 4 is a display screen showing the data location according to the data locating device and method of the invention.

The process of data locating for a data file according to the data locating method of the invention is now described in detail, by referring to FIGS. 2 to 4.

According to the invention, the data in a text file is identified by predefined different data units in forms of "data units". The "data units" are located by location elements and may include "sub data units".

As shown in FIG. 2, the "data units" mainly consist of five types of data units, that is, the "text (Text)", "single line (SingleLine)", "multi line (MultiLine)", "block (Block)" and "iterator (Iterator)". However, the invention shall not be limited in the above five types of data units, any other data units for data locating may be flexibly incorporated when needed.

In particular, the "Text" represents the string capable of being located and matched. For example, the data unit A in FIG. 2 is defined as a "Text" data unit.

The "SingleLine" represents the defined data unit is arranged in a line in the original data file. Fore example, the data unit B in FIG. 2 is defined as a "SingleLine" data unit.

The "MutiLine" represents the defined data unit is arranged in multiple lines consisting of plurality of single lines in the original data file. The plurality of single lines consisted of the "MutiLine" data unit have the position relationship that the start columns thereof are not all the same; or the end columns thereof are not all the same; or both the start columns and the end columns thereof are respectively the same, or neither the start columns nor the end columns are the same. For example, the data unit C in FIG. 2 is defined as a "MutiLine" data unit.

The "Block" represents such a block that the defined data unit is arranged in plurality of single lines which are close with each other and which have the same start position and the same end position in the column direction. For example, the data unit D in FIG. 2 is defined as a "Block" data unit. Then, the plurality of single lines consisted of a "Mutiline" may be defined by "MutiLine" or "Block", if the plurality of single lines have both the same start column and the same end column. The developer may flexibly define the data units according to his need and favorite.

The "Iterator" represents the data unit arranged in the original data file in such a manner that the data unit includes several sub data units having the same form feature and iteratively presenting. For example, the data unit E in FIG. 2 is defined as an "Iterator" data unit, including the sub data units F having the same type and iteratively presenting, which in turn includes two "SingleLine" sub data units J and K. The "Iterator" is used to define the list data.

The persons in the art will understand that the definition on the type of a data unit is not unique, and the type of a data unit may be defined as needed. For example, the data unit having the type of "Block" may be incorporated into "MutiLine" data unit. For example, when deciding which type the data unit consisting of a plurality single lines is divided into, one may consider the content of the data unit and/or the format of the objective data file, before choosing the type as one of the "Block", "MutiLine" or "Iterator". The type of a data unit may be randomly defined so far as the data unit may be effectively located and extracted. This embodies one advantage of the invention, that is, the locating according to the invention is flexible and extensive.

In addition, when locating data in an original file based on the data units, the data units may be iteratively located and extracted. For example, after the data unit C is located as a "MutiLine" data unit, the "SingleLine" data units G, H and I included in the "MutiLine" data unit may be further located and extracted. The iteratively locating may be proceeded to such a degree that the data in an original data file may be transformed into the corresponding area in the objective file. The developer may flexibly set data units in the original data file as needed.

After the data units are determined in an original data file, the location elements for locating the data units need to be determined, in order to correctly locate and extract the data units. The positions of the other four data units need to be determined by the location elements, except that the "Text" data unit may be directly defined by string matching.

Four types of location elements are used to determine the position of a data unit, according to the invention, that is, the "top (Top)" representing the uppermost position of the data unit; the "bottom (Bottom)" representing the lowest position of the data unit; the "left (Left)" representing the most left position of the data unit, and the "right (Right)" representing the most right position of the data unit.

Each of the location elements is defined by several basic attributes, which are: "base (Base)" which is a different data unit as the location reference of the data unit;
"from (From)", which is a position in the "Base" and used as the location referring position for the location element;
"skip (Skip)", which represents the offset of the location element from the "From".

Other attributes may be used, in addition to the above attributes, which include: "until (Until)" which represents the location element stops at certain position; "before (Before)" which represents the offset of the location element stops before a markup; "after (After)" which represents the offset of the location element stops after a markup.

Specifically, the value of the attribute "Base" may be the ID of a "data unit" having been located, such as the ID of the data unit having the type of "Text", or "the start of a line (RB)", "the end of a line (RE)", "the start of a column (CB)" and "the end of a column (CE)". "The start of a line (RB)", "the end of a line (RE)", "the start of a column (CB)" and "the end of a column (CE)" all refer to the line or the column the "Base" currently located. The "Base" may also be an original point in an absolute coordinate.

The "From" may be a relative start position (START) or a relative end position (END) of a location element with respect the "Base".

"Until" may be a string or a character as the stop position of a location element.

"Before" may be the line/column just before the stop markup where the offset of the location element ends.

"After" may be the line/column just after the stop markup where the offset of the location element ends.

The positive offset "+N" represents moving N columns/lines in the down/right direction; the negative offset "−N" represents moving N columns/lines in the up/left direction.

When describing the attributes on the location elements of the data units in a data file, the attribute "Base" for all the location elements may be the same data unit the location of which has been determined, for example, certain "Text" data unit; or any other data unit the location of which has been determined. The locating may also be performed by using the absolute coordinates of the data units.

As show in FIG. 2, the data unit A may be defined as a "Text" data unit by string matching. The data units B, C and D may be defined by the position relationship with the data unit A, and some basic location elements, such as "RB", "RE", "CB" and "CE". For example, the location element "Left" of the data unit B may be defined by using the attributes: "Base"=A, "From"="End", "Skip"=+m columns; the location element "Bottom" of the data unit D may be defined by using the attributes: "Base"=A, "From"="End", "Skip"=+u lines. The attributes of other location elements may be defined in the same manner.

The data unit B may be described by the basic attributes of the location elements, when using XML language, as followings:

```
<SingleLineSpan>
<Top BASE = "A", from = "Start"/>
<Left BASE = "A", from = "End", SKIP = "+m ">
<Right BASE = "RE", from = "Start", SKIP = "-n ">
</SingleLineSpan>
```

Other attributes, in addition to the basic attributes, may be used to describe the location elements of the data unit B. For example, assuming the first character in the left of the data unit is "#", then the code on the location of the left of the data unit B may be replaced with <Left BASE="A", from ="End", SKIP=" ", UNTIL="#">, in XML language.

It will be apparent for the persons in the art to flexibly employ the attributes to describe the location elements of a data unit.

In the above example, the respective attributes of the "Left" and the "Bottom" location elements of the data units B and D are described by defining the data unit A as the "Base". However, the respective attributes of the "Left" and the "Bottom" location elements of the data units B and D may be described by defining any of the data units, such as the data unit C, as the "Base", with the condition that the "Base" referred by a location element of a data unit shall be the data unit having been determined and located.

The method for locating a data unit according to the invention includes at least the following manners. The first is to locate a data unit by string matching, the second is to locate a data unit by the relative coordinates between the data units, the third is to locate a data unit by the absolute coordinates of the data unit. The developers may use any of them or any combination of them to define the attributes of the location elements of a data unit. This embodies another advantage of the invention, that is, the invention can flexibly locate and extract a data unit.

The data in any types of data files may be located by the determined data units, the location elements of the data units and the attributes of the location elements. The developer may flexibly locate a data unit according to the format feature of an object file and/or the format feature of a source data file and/or the contents thereof to locate a data unit.

It will be understood by the persons in the art that, the data units, the location elements of the data units and the attributes of the location elements may be extended and modified, if necessary, so that the location method based on text markup matching and two dimensional space coordinate positions may be more rich.

FIG. 3 is a flow chart of a data locating method of the invention.

As shown in figure, at step S301, the data unit determination unit 101 determines a data unit in the data file needed to be located.

At step S302, the type determination unit 102 determines a type for the data unit.

At step S303, it is judged whether or not the type of the data unit is "Text".

When the type is not "Text", the step proceeds to the step S304, where the location reference determination unit 103 chooses a different data unit as the reference for the data unit; at step S305, the data unit location description generation unit 104 generates the description of the position of the data unit, based on the type of the data unit and the position relationship between the data unit and the different data unit.

The description includes the type of the data unit, one or more location elements for locating the data unit.

The location elements includes "Top", "Bottom", "Left" and "Right".

each of the location elements includes a combination of the attributes to determine the position of the location element, the attributes include:

"Base", which is the different data unit;

"From", which is a position in the "Base" and used as the location referring position for the location element;

"Skip", which represents the offset of the location element from the "From".

Then the location description about a non-text type of data unit to be located is generated.

At step S303, when the type is "Text", the step proceeds to S306, where the locating process is performed by string matching.

The locating process for locating other data units in the data file is the same as that shown in FIG. 3.

It will be understood for the persons in the art that when a data unit includes sub data units, in other words, when it is needed to iteratively locate the data unit, the above process may be used to locate the sub data units.

It will be understood for the persons in the art that the products, the programs and the medium for recording the programs for determining the data units, the location elements of the data units and the attributes of the location elements according to the invention may be implemented in any kinds of software and/or hardware.

The process for locating data by the data locating device and the method according to the invention is now described.

FIG. 4 is a display screen showing the data locating according to the data locating device and method of the invention.

A data resource needed to be described is displayed in the window on the upper left in the display screen. The data resource is loaded to a display unit (now shown) in the data locating device of the invention by a user. The display unit presents the data source in the form of a displaying screen. The display unit may be, for example, a display.

A tool bar for use by the user to determine the type of a data unit exists at the left of the window on the upper left of the screen. The L represents "Text", S represents "SingleLine", M represents "MultiLine", B represents "Block" and I represents "Iterator".

When the user, for example, needs to locate the "Currency" data unit in the data resource, he firstly points before the string "Currency:" and moves to the end of the string by using a pointing device such as a mouse or a keyboard etc., to markup the data unit. The data unit determination unit 101 determines the data unit, and assigns an identification number ID to the "Currency:" data unit, so that the "Currency:" data unit may be referred to by other data units.

Then, the user clicks the L in the tool bar by using the point device to select the "Text" data unit determination tool. The type determination unit 102 determines the type of the data unit as "Text".

Then the data unit location description generation unit 104 determines the location elements for the data units, that is, "Top", "Bottom", "Left" and "Right". The data unit location description generation unit 104 may easily calculate the position (coordinate) of the "Currency:" data unit, by employing the string matching method in the prior art, because the "Currency:" data unit is a constant in the data file.

Thus, the "Currency:" data unit of the type "Text" is located.

We now describe the process for locating the non-text data unit, for example, the single line string comprising "USD" after the "Currency:" data unit. The type of the single line string is different from the type of the string "Currency:", because the former is variable. For example, in other data files, the single line string may be ended with another currency sign, such as "RM" or The user marks up the non-text data unit by pointing after the string "Currency:" and moving to the end of the non-text string including the "USD". The data unit determination unit 101 determines the data unit, and assigns an identification number ID to the data unit, so that it may be referred to by other data units. In FIG. 4, the data unit is highlighted to prompt the user the data unit he currently selects.

Then, the user clicks the S in the tool bar by using the point device to select the "SingleLine" data unit determination tool. The type determination unit 102 determines the type of the data unit as "SingleLine".

The location reference determination unit 103 prompts the user to use the pointing device to select a location reference, because the data unit is not the type of "Text". In the above example, the user selects the "Currency:" data unit as the location reference of the data unit.

The data unit location description generation unit 104 determines the "top (Top)", "left (Left)" and "right (Right)" as the location elements to further determine their relative positions with respect to the "Currency:", i.e, the positions of these location elements, based on the type of the data unit, that is, "SingleLine", and the position relationship between the selected data unit and the "Currency:" text data unit. In the example, because the positions of the single line string including the "USD" and the "Currency:" have been determined, the "top (Top)", "left (Left)" and "right (Right)" of the single line string including the "USD" may be determined with respect to the location reference "Currency:".

For the example shown in FIG. 4, the location description on the single line string data unit including the "USD" generated by the data unit location description generation unit 104 is described in XML language as:

```
<SingleLineSpan>
    <Top BASE = "Currency:", from = "Start", Skip = ""/>
    <Left BASE = "Currency:", from = "End"/>
    <Right BASE = "RE", from = "Start"/>
</SingleLineSpan>
```

When the Skip=" ", it means skipping zero line/column, then the description thereof may be omitted. In addition, the "RE" means the end of the line of the location reference.

In the above location description, each of the location elements comprises a combination of the attributes. For example, the location element "top (Top)" includes the combination of the attribute "Base", the attribute "From" and the attribute "Skip". Such a combination determines the position of the location element "top", that is, it regards the top of the "Currency:" as its start and skips zero line.

The location element "left (Left)" includes the combination of the attribute "Base", the attribute "From" and the attribute "Skip". Such a combination determines the position of the location element "Left", that is, it regards the end of the column of the "Currency:" as its start and skips zero line.

The location element "right (Right)" includes the combination of the attribute "Base", the attribute "From" and the attribute "Skip". Such a combination determines the position of the location element "right", that is, it regards the end of the line where the "Currency:" is in as its start and skips zero line.

The value of the attribute Base may be an identifier. In the above example, it can be described as Base="ID1", in which the "ID1" is the identifier assigned to the "Currency:".

It will be understood by the persons in the art that, the data unit location description generation unit 104 may determine the position relationship between the selected data unit and the "Currency:" text data unit, by the known graph recognization and the coordinate position locating, and etc.

The position of the single line data unit including "USD" is described clearly, after the positions of the location elements are described clearly.

The location descriptions of other types of the data units may be generated by employing the process shown in FIG. 4.

The location descriptions of the data units generated for the data resource through the above process may be stored, and the sample processing results may be displayed by the display unit not shown. The window at the left and down shows the results of data locating and extracting on the sample shown in the window at the right and upper.

The location description generated by the data unit location description generation unit 104 may be adjusted by a location description adjusting unit not shown. For example, when the Base of the single line string data unit including the "USD" is changed, the other attributes of related location elements will be accordingly changed, then the location description adjusting unit may be used to make the adjustment.

The data transforming device and method will now be described according to the data locating method of the invention.

Figure 5:
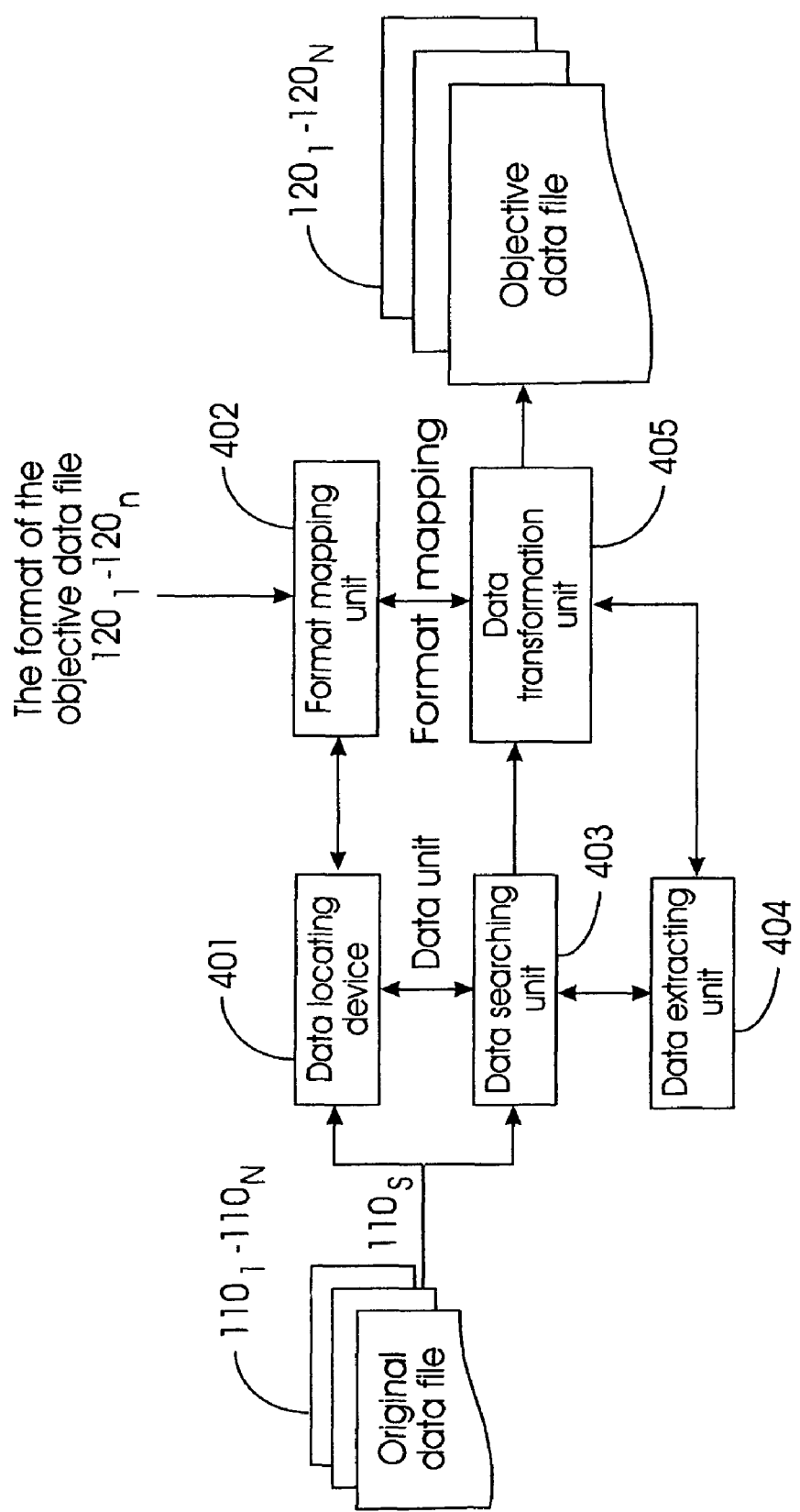
FIG. 5 is a functional block diagram of a data transformation device of the invention.

FIG. 5 shows the functional block diagram of the data transforming device according to the invention.

The data transforming device transforms one or more source data files 1101-110N having the first format into one or more objective data files 1201-120N, by employing the data locating device shown in FIG. 1.

As shown in FIG. 5, the data transforming device comprises the data locating device 401, the format mapping unit 402, the data searching unit 403, the data extracting unit 404 and the data transforming unit 405.

The function of the data locating device 401 has been described by referring to FIGS. 1 to 4. The device generates the location descriptions of the data units for locating the data in a data file. The format mapping unit 402 builds up the correspondence between the data units and the second format. The data searching unit 403 searches the data in the source data file to determine the position of the data. The data extracting unit 404 extracts the data the position of which has been determined. The data transforming unit transforms the extracted data into data in the objective data file.

In particular, the data locating device 401 generates the location descriptions on the plurality of data units needed to be transformed in the sample file 110s, according to the process shown in FIG. 3. In addition, it will be understood for the persons in the art to directly generate the location descriptions of the data units on the data needed to be described in the plurality of the source data files 1101-110N, without using the sample file 110s. The solution employing the sample file to generate the location descriptions of the data units is preferably adapt to the situation of transforming the data in the data files having the same fixed structure in batch mode.

As to one or more source data files 1101-110N, they may be the data files having the same format features (such as having the common locating features in the plane coordinate), or may be the source data files having different formats but the data are located from the different source data files and the located data is extracted and output to the same new object file so as to generate the new object file.

According to one embodiment, the sample file 110s (1≦s≦N) is choosed freely from the source data files 1101-110N having the same format feature, so as to generate the location descriptions on the data units for data locating in the source data files 1101-110N. The embodiment preferably adapts to locate and extract the data in the files in batch mode.

According to another embodiment, the location descriptions of the data units for data locating in the source data files 1101-110N are generated, based on the location features of the data in the plurality of source data files 1101-110N needed to be transformed into the corresponding location areas in an objective data file. The embodiment preferably adapts to extract different data from different source data files, so as to generate the data in one objective data file.

Then, the generated location descriptions of the data units may be applied to all the source data files 1101-110N by the data searching unit 403 and the data extracting unit 404, so as to extract and locate the data units in the source data files 1101-110N needed to be transformed into the data in the objective data files.

The format mapping unit 402 builds up the correspondence between the data units located by the data locating device 401 and the format of the objective data file.

When the location descriptions of the data units in a source data file needed to be located are generated, each of the data units determined to be located is mapped to the corresponding format (corresponding area) of the objective data file, according to the format feature of the objective data file, so as to transform the data in the original data file into the data in the objective data file. Then the corresponding relationship between the data units to be located and the format of the objective data file need to be built up.

The format of the object file called herein may be any specific text format or the unified data format in a network such as XML, according to the user's requirement.

The corresponding relationship built up by format mapping may comprise many groups of format mapping correspondence relationship with respect to many types of the output formats, according to the requirement of the output text formats. Each group defines the correspondence between the data units to be located and certain specific object file. Then many types of outputs may be generated when necessary.

The data transforming unit 405 transforms the data units extracted by the data extracting unit 404 into the data in the objective data file having a specific format or outputs the data into the corresponding areas in the objective data file, based on the correspondence relationship between the data units to be located and the specific format of the objective data file built up by the format mapping unit 402.

It will be understandable that the persons in the art may employ any kinds of software and/or hardware to implement the function of each of the units in the data transforming device according to the invention. For example, the known computer, Web server, network and/or the software running in these facilities may implement the invention.

It should be pointed out herein that the invention may also comprise a location description storage and a format mapping correspondence relationship storage, for respectively storing the location descriptions of the data units generated by the data locating device and the correspondence generated by the format mapping unit, so as to be used later. These storage may be implemented by any known hardware, such as hard disk, soft disk or memory. It will be understood for the persons in the art that the above storage may be implemented by software, such as database or files. Additionally, the two kinds of storages may be combined.

The data locating device and the data transforming device employ the data locating method based on text mapping and two dimensional space coordinate position locating. Compared with the data locating and extracting method in the prior art, the invention has great advantages, mainly in the flexibility and extension of the data extracting and locating.

FIG. 5 shows the flow chart to transform the data in original data files into the data in the objective data files.

At step S501, the data in the original data files 1101-110N is determined, the data location descriptions on one or more data units to be located are generated. The detailed description on this step is shown in FIG. 3.

At step S502, the correspondence between the data to be located and the specific formats of the objective data files is built up, that is, the correspondence between the data units to be located and the specific formats of the objective data files is built up.

At step S503, the data in the source data files 1101-110N are located, that is, the data units in the original data files are located based on the location descriptions on the one or more data units.

At step S504, the data units to be located in the original data files are extracted.

At step S505, the extracted data is transformed into the data in the objective data files, in which the data units extracted at step S504 are transformed into the data in the objective data files, based on the correspondence between the one or more data units to be located and the specific formats of the objective data files.

Figure 6:
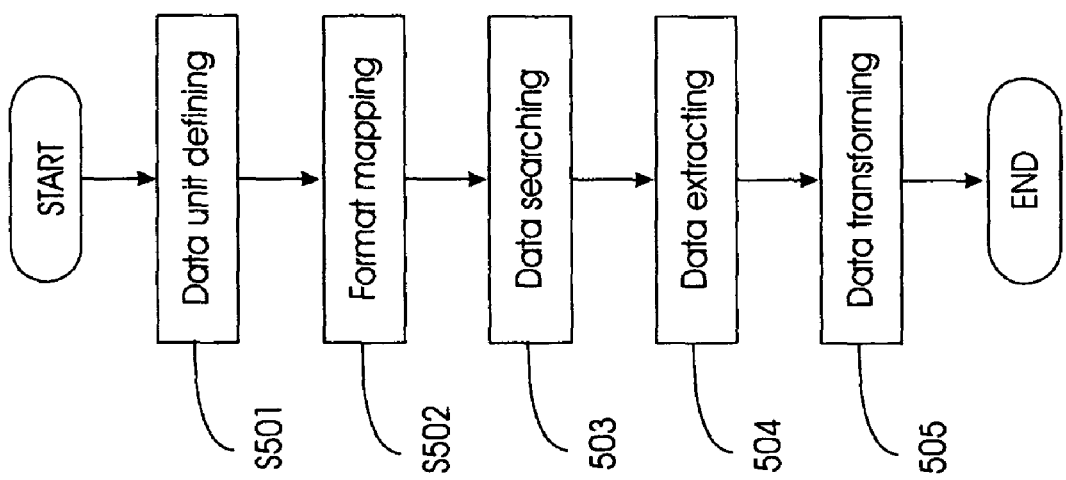
FIG. 6 is a flow chart showing transforming data in an original data file into data in an objective data file according to the data transforming method of the invention.
Figure 7:
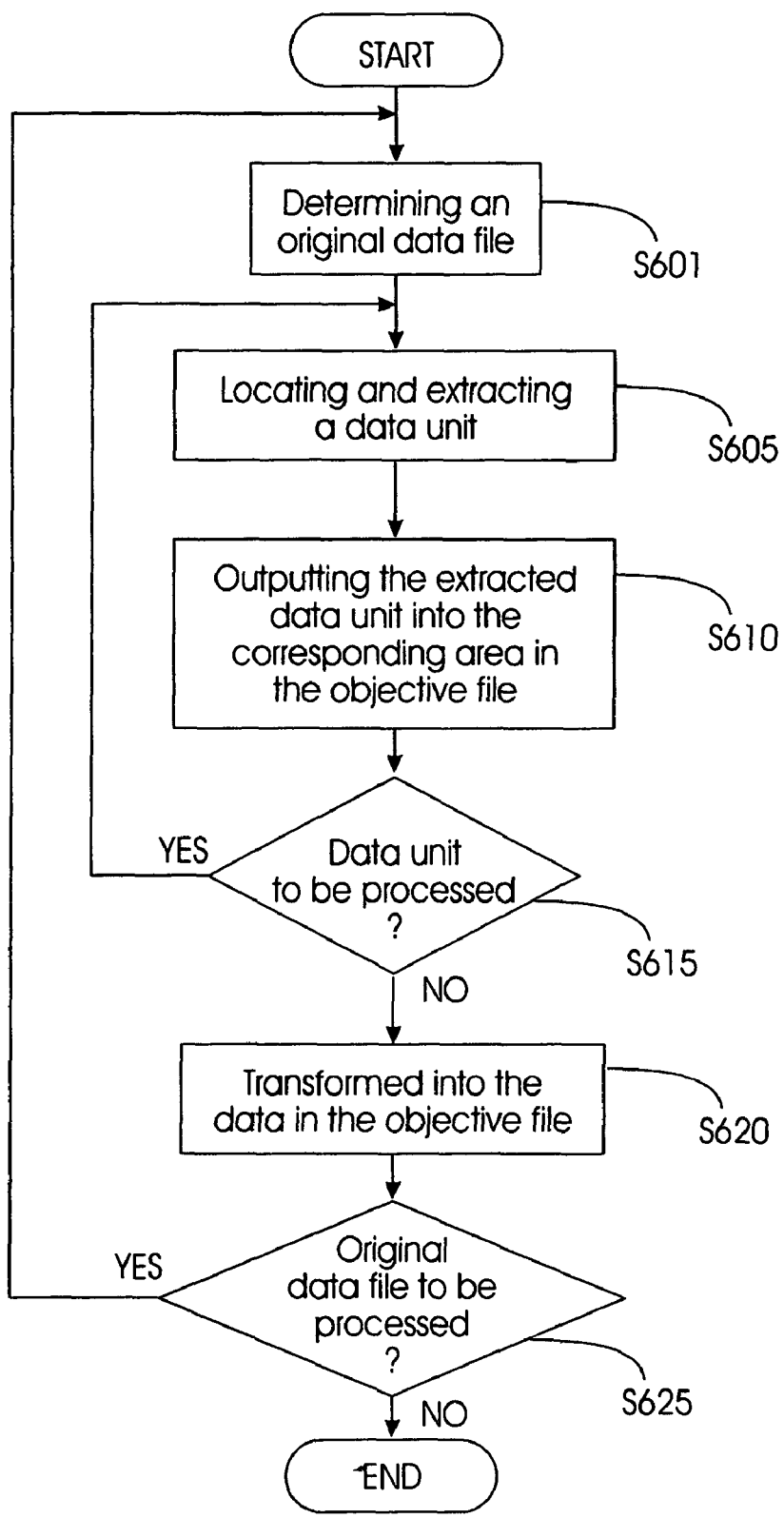
FIG. 7 is a flow chart showing transforming data in a plurality of original data files.

FIG. 6 is the flow chart showing the data transforming device transforming the data in the original data files, after the data in the original data files are located.

At step S601, an original data file to be processed is determined.

At step S605, the data searching unit 403 and the data extracting unit 404 locate and extract a data unit, based on the location description on the data unit generated by the data locating device 401.

At step S610, the extracted data unit is output to the corresponding area in the objective data files, based on the correspondence built up by the format mapping unit 402.

At step S615, it is determined whether or not there is other data unit needed to be transformed. And if there is, the process returns step S605. Otherwise it proceeds to step S620.

At step S620, the data in the original data file are transformed into the data in the objective data files.

At step S625, it is determined whether or not there is other data file needed to be transformed. And if there is, the process return step S601. Otherwise it ends.

It will be understood for the persons in the art that only the location or the correspondence associated with the data units being changed need to be updated by the data locating device 401 or the format mapping unit 402, if some of the data units in the original data files are changed or the correspondence with the formats of the objective data files are changed. The data searching unit 403, the data extracting unit 404 and the data transforming unit 405 need not to be changed. Therefore, the data unit locating and the correspondence updating are flexible. Typically, when transforming in batch mode, the process of generating the data unit location description and the process of setting the correspondence are executed only one time, and then they are applied in the process of data transforming. Only the location description and the correspondence about the data units being changed need to be updated, so that the load of the operators is greatly reduced.

In addition, the data locating method according to the invention may be applied in all kinds of known application systems, to transform the data in the data files in individual system into the data in the objective data source. Then the developing cost is reduced because no specific data transforming tool need to be customized to adapt to the specific system.

The invention may be used in various types of original files, because it is a data locating and transforming method based on text markup matching and two dimensional space position locating.

The process of the data transforming method according to the invention may be implemented by any kinds of software and/or hardware, or the medium recording the programs.

The invention has been described by reference to the embodiments and the drawings which are not used to limit the invention. And the invention can be modified and improved without departing the spirit and the scope of the claims.

What is claimed:

1. A method for generating at least a first output file from at least one input file, comprising the steps of:
   defining at least one data unit of the at least one input file;
   determining one or more locations within the at least one input file of the at least one data unit; and
   transferring the at least one data unit from the one or more locations within the at least one input file to the one or more locations within the first output file specified by a mapping of the at least one data unit of the at least one input file to one or more locations within the first output file;
   wherein each location comprises a horizontal position, the horizontal position comprising at least one of an uppermost position of the data unit or a lowermost position of the data unit, and a vertical position, the vertical position comprising at least one of the leftmost position of the data unit or the rightmost position of the data unit; and
   wherein each data unit is defined based on at least one of: at least one string, at least one absolute position of the data unit within the input file, at least one relative position of the data unit to a start or end of at least one of a row or column of the input file, and at least one relative position of the data unit to another data unit.

2. The method of claim 1, wherein the at least one string is within the data unit.

3. The method of claim 2, wherein the at least one string is adjacent to the data unit.

4. The method of claim 1, wherein the step of transferring the at least one data unit comprises transforming the at least one data unit from a first format to a second format.

5. The method of claim 1, further comprising a step of generating a second output file from the at least one input file by transferring the at least one instance of the data unit from the one or more locations within the at least one input file to the one or more locations within the second output file specified by the mapping of the at least one data unit of the at least one input file to one or more locations within the first output file.

6. The method of claim 1, further comprising a step of generating a second output file from the at least one input file by transferring the at least one instance of the data unit from the one or more locations within the at least one input file to one or more locations within the new output file specified by a mapping of the at least one data unit of the at least one input file to one or more locations within the second output file.

7. The method of claim 1, further comprising the step of generating a second output file from at least one new file by determining one or more locations within the at least another new file of the at least one data unit of the at least one input file and transferring the at least one data unit from the determined one or more locations within the at least one new file to the one or more locations within the output file specified one or more locations within the new output file specified by the mapping of the at least one data unit of the at least one input file to one or more locations within the first output file.

8. An apparatus for generating at least a first output file from at least one input file, the apparatus comprising:
   a memory, operative to store at least a portion of at least one of the at least first output file and the at least one input file;
   at least one processor, operative to perform the operations of:
      defining at least one data unit of the at least one input file;
      determining one or more locations within the at least one input file of the at least one data unit; and
      transferring the at least one data unit from the one or more locations within the at least one input file to the one or more locations within the first output file specified by a mapping of the at least one data unit of the at least one input file to one or more locations within the first output file;
   wherein each location comprises a horizontal position, the horizontal position comprising at least one of an uppermost position of the data unit or a lowermost position of the data unit, and a vertical position, the vertical position comprising at least one of the leftmost position of the data unit or the rightmost position of the data unit; and wherein each data unit is defined based on at least one of: at least one string, at least one absolute position of the data unit within the input file, at least one relative position of the data unit to a start or end of at least one of a row or column of the input file, and at least one relative position of the data unit to another data unit.

9. The apparatus of claim 8, wherein the at least one string is within the data unit.

10. The apparatus of claim 8, wherein the at least one string is adjacent to the data unit.

11. The apparatus of claim 8, wherein the operation of transferring the at least one data unit comprises transforming the at least one data unit from a first format to a second format.

12. The apparatus of claim 8, wherein the processor is further operative to perform the operation of generating a second output file from the at least one input file by transferring the at least one instance of the data unit from the one or more locations within the at least one input file to the one or more locations within the second output file specified by the mapping of the at least one data unit of the at least one input file to one or more locations within the first output file.

13. The apparatus of claim 8, wherein the processor is further operative to perform the operation of generating a second output file from the at least one input file by transferring the at least one instance of the data unit from the one or more locations within the at least one input file to one or more locations within the new output file specified by a mapping of the at least one data unit of the at least one input file to one or more locations within the second output file.

14. The apparatus of claim 8, wherein the processor is further operative to perform the operation of generating a second output file from at least one new file by determining one or more locations within the at least another new file of the at least one data unit of the at least one input file and transferring the at least one data unit from the determined one or more locations within the at least one new file to the one or more locations within the output file specified one or more locations within the new output file specified by the mapping of the at least one data unit of the at least one input file to one or more locations within the first output file.

15. A computer program product for generating at least a first output file from at least one input file, the computer program product comprising a non-transitory computer usable medium having computer usable program code embodied therewith, the computer usable program code comprising computer usable program code configured to perform the operations of:

defining at least one data unit of the at least one input file;

determining one or more locations within the at least one input file of the at least one data unit; and transferring the at least one data unit from the one or more locations within the at least one input file to the one or more locations within the first output file specified by a mapping of the at least one data unit of the at least one input file to one or more locations within the first output file;

wherein each location comprises a horizontal position, the horizontal position comprising at least one of an uppermost position of the data unit or a lowermost position of the data unit, and a vertical position, the vertical position comprising at least one of the leftmost position of the data unit or the rightmost position of the data unit; and wherein each data unit is defined based on at least one of: at least one string, at least one absolute position of the data unit within the input file, at least one relative position of the data unit to a start or end of at least one of a row or column of the input file, and at least one relative position of the data unit to another data unit.

16. The computer program product of claim 15, wherein the at least one string is within the data unit or wherein the at least one string is adjacent to the data unit.

17. The computer program product of claim 15, wherein the operation of transferring the at least one data unit comprises transforming the at least one data unit from a first format to a second format.

18. The computer program product of claim 15, the computer usable program code further comprising computer usable program code configured to perform the operation of generating a second output file from the at least one input file by transferring the at least one instance of the data unit from the one or more locations within the at least one input file to the one or more locations within the second output file specified by the mapping of the at least one data unit of the at least one input file to one or more locations within the first output file.

19. The computer program product of claim 15, the computer usable program code further comprising computer usable program code configured to perform the operation of generating a second output file from the at least one input file by transferring the at least one instance of the data unit from the one or more locations within the at least one input file to one or more locations within the new output file specified by a mapping of the at least one data unit of the at least one input file to one or more locations within the second output file.

20. The computer program product of claim 15, the computer usable program code further comprising computer usable program code configured to perform the operation of generating a second output file from at least one new file by determining one or more locations within the at least another new file of the at least one data unit of the at least one input file and transferring the at least one data unit from the determined one or more locations within the at least one new file to the one or more locations within the output file specified one or more locations within the new output file specified by the mapping of the at least one data unit of the at least one input file to one or more locations within the first output file.

\* \* \* \* \*